US011984251B2

(12) United States Patent
Oishi

(10) Patent No.: US 11,984,251 B2
(45) Date of Patent: May 14, 2024

(54) COIL COMPONENT AND METHOD FOR MANUFACTURING COIL COMPONENT

(71) Applicant: Murata Manufacturing Co., Ltd., Kyoto-fu (JP)

(72) Inventor: Masayuki Oishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 514 days.

(21) Appl. No.: 17/224,641

(22) Filed: Apr. 7, 2021

(65) Prior Publication Data

US 2021/0327635 A1 Oct. 21, 2021

(30) Foreign Application Priority Data

Apr. 17, 2020 (JP) ................................. 2020-074331

(51) Int. Cl.

| | |
|---|---|
| ***H01F 27/28*** | (2006.01) |
| ***H01F 27/24*** | (2006.01) |
| ***H01F 27/29*** | (2006.01) |
| ***H01F 41/02*** | (2006.01) |
| ***H01F 41/04*** | (2006.01) |

(52) U.S. Cl.

CPC ......... *H01F 27/2804* (2013.01); *H01F 27/24* (2013.01); *H01F 27/29* (2013.01); *H01F 41/0206* (2013.01); *H01F 41/041* (2013.01); *H01F 2027/2809* (2013.01)

(58) Field of Classification Search

CPC .......... H01F 27/29; H01F 27/06; H01F 41/02; H01F 2027/065; H01F 27/2852; H01F 1/26; H01F 2017/048; H01F 17/04; H01F 27/292

USPC ......................................... 336/192, 198, 200

See application file for complete search history.

(56) References Cited

U.S. PATENT DOCUMENTS

2016/0078997 A1* 3/2016 Son ..................... H01F 17/0013 174/260
2018/0301270 A1* 10/2018 Yang ..................... H02M 3/155
2018/0374636 A1* 12/2018 Itani ......................... H01F 27/24
2019/0035535 A1* 1/2019 Furukawa .............. H01F 1/147

FOREIGN PATENT DOCUMENTS

| | | | |
|---|---|---|---|
| CN | 107622861 | A | 1/2018 |
| JP | H11-219821 | A | 8/1999 |
| WO | 2011/148678 | A1 | 12/2011 |

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

A coil component and a method for manufacturing the coil component. A coil component includes a body having a plurality of stacked magnetic layers, and a coil inside the body and having a plurality of stacked coil wirings. The magnetic layers and the coil wirings are alternately stacked in one direction, a first surface of the coil wiring on one side in the one direction and one magnetic layer located on one side in the one direction of the coil wiring are in contact with each other, a gap portion exists between a second surface of the coil wiring on the other side in the one direction and the other magnetic layer located on the other side in the one direction of the coil wiring, and a magnetic film is present in at least a part of the second surface of the coil wiring.

16 Claims, 8 Drawing Sheets

COIL COMPONENT AND METHOD FOR MANUFACTURING COIL COMPONENT

CROSS-REFERENCE TO RELATED APPLICATION

This application claims benefit of priority to Japanese Patent Application No. 2020-074331, filed Apr. 17, 2020, the entire content of which is incorporated herein by reference.

BACKGROUND

Technical Field

The present disclosure relates to a coil component and a method for manufacturing the coil component.

Background Art

As a coil component of the related art, there is a coil component described in Japanese Patent Application Laid-Open No. 11-219821. The coil component includes a body and a coil provided inside the body. The body includes a plurality of magnetic material layers, and the coil includes a plurality of conductor layers. The magnetic material layers and the conductor layers are alternately stacked. In order to relax stress between the conductor layer and the magnetic material layer, gap portions are provided on an entire circumference of the conductor layer.

SUMMARY

Incidentally, in the coil component of the related art, the conductor layer forming the coil and the magnetic material layer are not in direct contact with each other, and there is a concern that a location of the coil is not stabilized in such a coil component. When there is a defect (cracking, crazing, or the like) in the body for some reason and a corrosive gas (sulfide gas) invades the gap portion, the conductor layer is corroded by the corrosive gas, and there is a concern that a specific resistance (Rdc) of the coil increases.

Thus, the present disclosure is to provide a coil component capable of stabilizing a location of a coil and suppressing an increase in a specific resistance of a coil by a corrosive gas while relaxing stress, and a method for manufacturing the coil component.

According, a coil component which is an aspect of the present disclosure includes a body, and a coil provided inside the body. The body has a plurality of stacked magnetic layers, and the coil has a plurality of stacked coil wirings. The magnetic layers and the coil wirings are alternately stacked in one direction, a first surface of the coil wiring on one side in the one direction and one magnetic layer located on one side in the one direction of the coil wiring are in contact with each other. Also, a gap portion is provided between a second surface of the coil wiring on the other side in the one direction and the other magnetic layer located on the other side in the one direction of the coil wiring, and a magnetic film is present in at least a part of the second surface of the coil wiring.

Here, the magnetic film may be a sheet-like film or a circular dot-like film, or may be a single film or a plurality of films separated from each other.

According to the above aspect, the gap portion is present between the second surface of the coil wiring and the other magnetic layer, and thus, the stress between the coil wiring and the magnetic layer is relaxed. Since the first surface of the coil wiring is in contact with one of the magnetic layers, the location of the coil wiring is further stabilized than when the gap portion is present on the entire circumference of the coil wiring. Since the magnetic film is present in at least a part of the second surface of the coil wiring, when the corrosive gas invades the gap portion for some reason, the coil wiring can be prevented from being corroded by the corrosive gas, and the increase in the specific resistance of the coil can be suppressed.

Preferably, in one embodiment of the coil component, when a thickness of the magnetic film is a and a thickness of the other magnetic layer is b, $a/(a+b) \leq 0.1$ . . . (Equation 1) is satisfied.

Here, the thickness of the magnetic film and the thickness of the other magnetic layer refer to the thicknesses at the center line of the coil wiring in the width direction in the cross section orthogonal to the extending direction of the coil wiring.

According to the above embodiment, since the thickness of the magnetic film can be reduced, a further stress relaxation effect can be obtained.

Preferably, in one embodiment of the coil component, a thickness of the magnetic film is 1 μm or less.

According to the above embodiment, since the thickness of the magnetic film can be reduced, a further stress relaxation effect can be obtained.

Preferably, in one embodiment of the coil component, a ratio of an area of the second surface of the coil wiring covered by the magnetic film is 50% or more and 100% or less (i.e., from 50% to 100%) with respect to an area of the second surface of the coil wiring.

According to the above embodiment, the coil wiring can be prevented from being corroded by the corrosive gas.

Preferably, in one embodiment of the coil component, a thickness of the gap portion is 0.5 μm or more and 8.0 μm or less (i.e., from 0.5 μm to 8.0 μm).

Here, the thickness of the gap portion refers to the thickness at the center line of the coil wiring in the width direction in the cross section orthogonal to the extending direction of the coil wiring.

According to the above-described embodiment, when the gap portion has such a thickness, the stress relaxation effect is sufficiently exhibited, and the high impedance value (inductance value) of the coil component is also secured since the thickness of the gap portion is within a specific range.

In one embodiment of a method for manufacturing a coil component, the method includes a preparatory step of preparing an unfired magnetic layer which contains a magnetic material and binders and in which the amount of binders increases from a first main surface to a second main surface except for at least the first main surface, and a stacking step of stacking an unfired coil wiring so as to sandwich the unfired coil wiring between two unfired magnetic layers and bringing the unfired coil wiring into contact with the second main surface of one unfired magnetic layer and the first main surface of the other unfired magnetic layer. The method also includes a firing step of firing the one unfired magnetic layer, the other unfired magnetic layer, and the unfired coil wiring, bringing one magnetic layer of the fired one unfired magnetic layer and a coil wiring of the fired unfired coil wiring into contact with each other, and forming a magnetic film in at least a part of a surface of the coil wiring on a gap portion side while forming the gap portion between the other magnetic layer of the fired other unfired magnetic layer and the coil wiring.

Here, the unfired magnetic layer is formed by, for example, a magnetic sheet or a magnetic paste. The unfired coil wiring is formed by, for example, a conductor paste.

According to the above embodiment, one magnetic layer and the coil wiring are brought into contact with each other by using the unfired magnetic layer in which the amount of binders is unevenly distributed, and the magnetic film can be formed in at least a part of the surface of the coil wiring on the gap side while forming the gap portion between the other magnetic layer and the coil wiring. Accordingly, the location of the coil is stabilized while relaxing the stress. When the corrosive gas invades the gap portion for some reason, the coil wiring can be prevented from being corroded by the corrosive gas, and the coil component capable of suppressing the increase in the specific resistance of the coil can be easily manufactured.

Preferably, in one embodiment of the method for manufacturing a coil component, in the preparatory step, the unfired magnetic layer includes a surface layer region including the first main surface and a minimum amount layer region adjacent to the surface layer region and having the smallest amount of binders, and the amount of binders in the surface layer region is larger than the amount of binders in the minimum amount layer region.

Here, the surface layer region refers to a layered region in a range of 1 μm or less from the first main surface in the thickness direction. The minimum amount layer region is a layered region having the smallest amount of binders in the unfired magnetic layer.

According to the above embodiment, since the amount of binders in the surface layer region is larger than the amount of binders in the minimum amount layer region, the binders in the surface layer region contribute to the bonding between the surface layer region of the unfired magnetic layer and the unfired coil wiring during degreasing in a firing procedure. Since the amount of binders in the minimum amount layer region is the smallest, the strength of the minimum amount layer region is the weakest, and the tearing of the unfired magnetic layer can occur in the minimum amount layer region during degreasing in the firing procedure.

Preferably, in one embodiment of the coil component manufacturing method, in the firing step, at least a part of the surface layer region of the other unfired magnetic layer is torn from the other portion of the other unfired magnetic layer and is attached to the unfired coil wiring, and the magnetic film is formed by firing the portion of the other unfired magnetic layer attached to the unfired coil wiring.

According to the above embodiment, since the magnetic film is formed from at least a part of the surface layer region of the other unfired magnetic layer, the magnetic film can be easily formed.

Advantageous Effect of the Disclosure

According to the coil component which is one aspect of the present disclosure and the method for manufacturing the coil component, the location of the coil can be stabilized while relaxing the stress, and the increase in the specific resistance of the coil by the corrosive gas can be suppressed.

DETAILED DESCRIPTION

Hereinafter, a coil component which is one aspect of the present disclosure and a method for manufacturing the coil component will be described in detail with reference to the illustrated embodiment. It should be noted that the drawings include some schematic diagrams and may not reflect actual dimensions and ratios.

Embodiment

Figure 1:
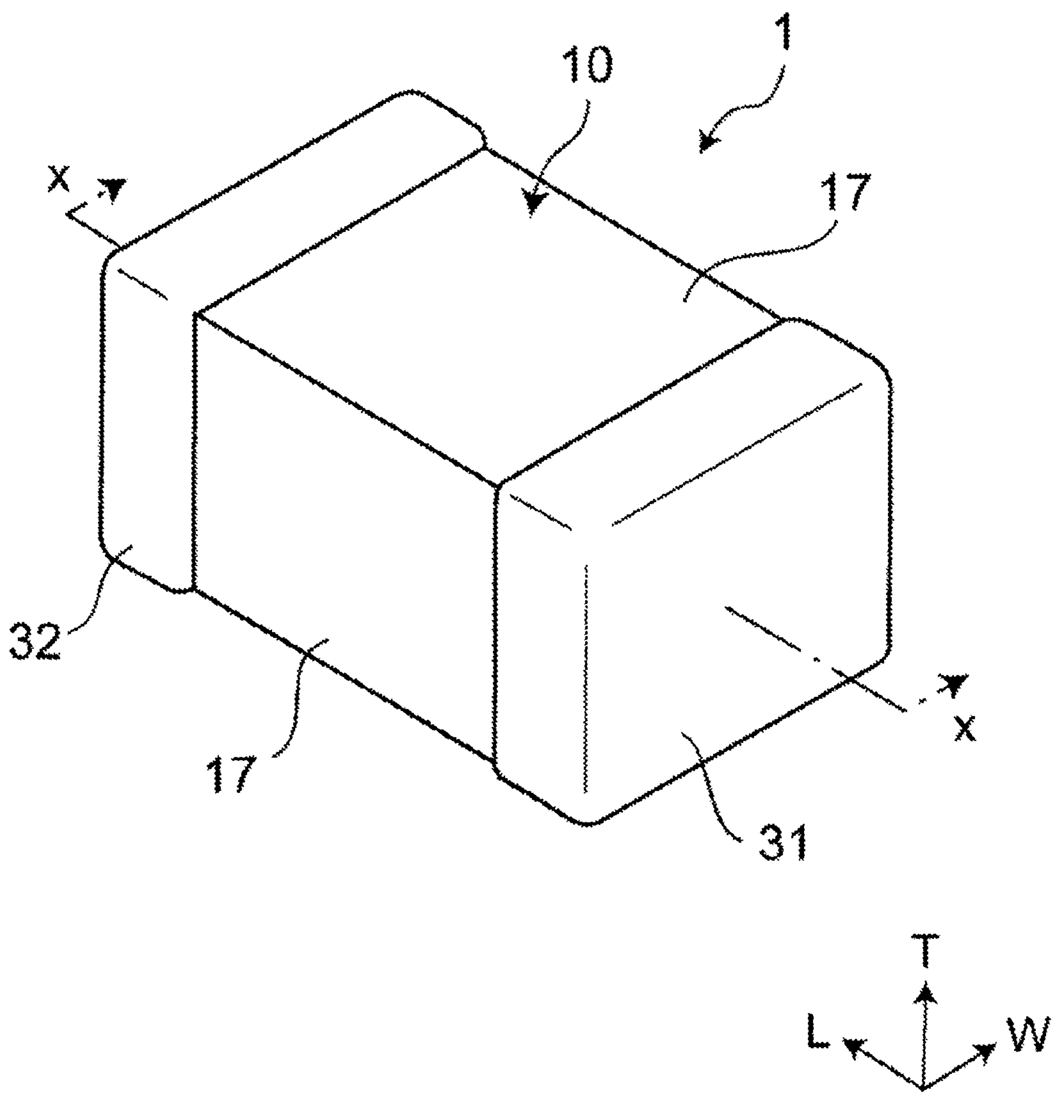
FIG. 1 is a perspective view illustrating an embodiment of a coil component.
Figure 2:
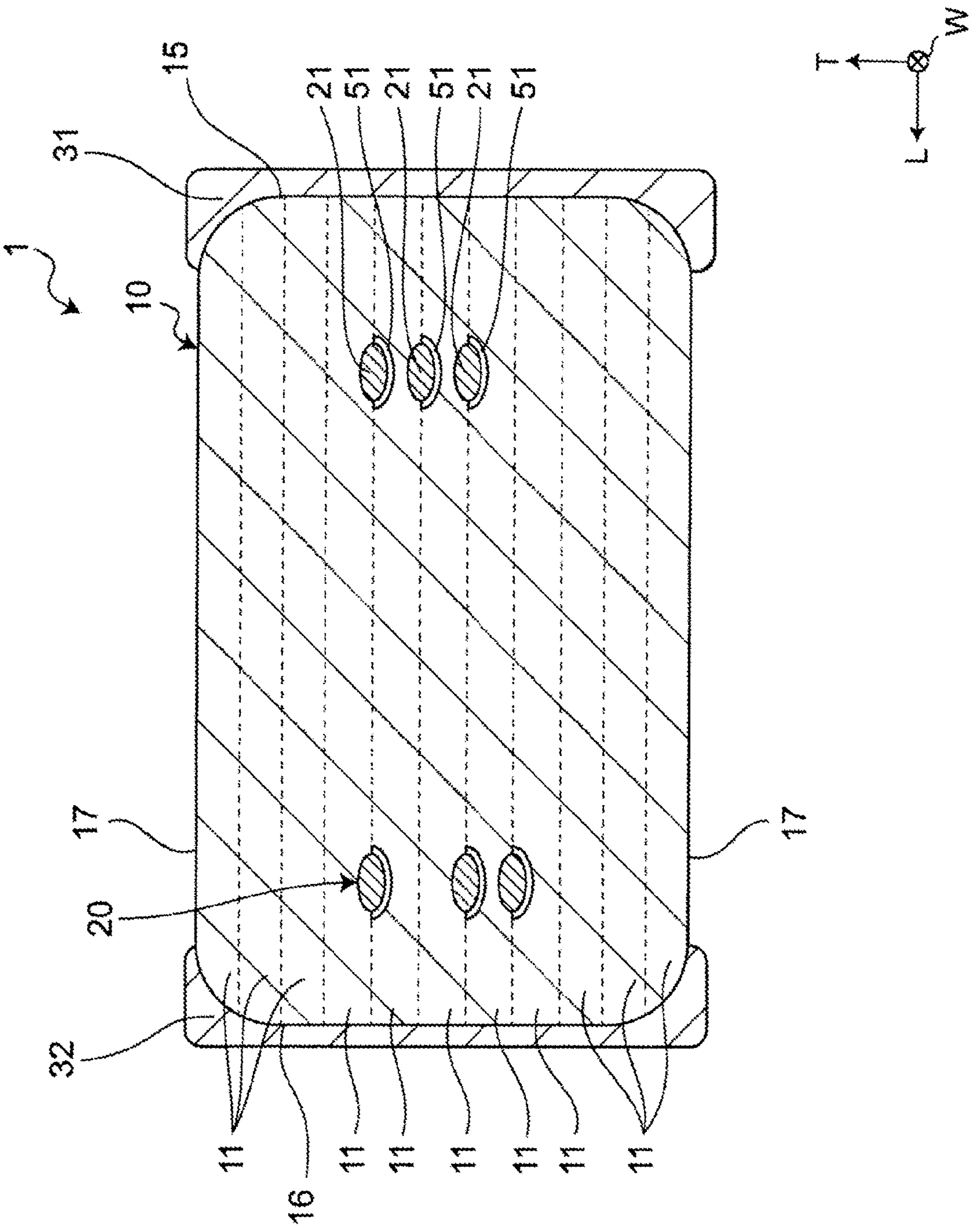
FIG. 2 is an X-X sectional view of the coil component of FIG. 1.
Figure 3:
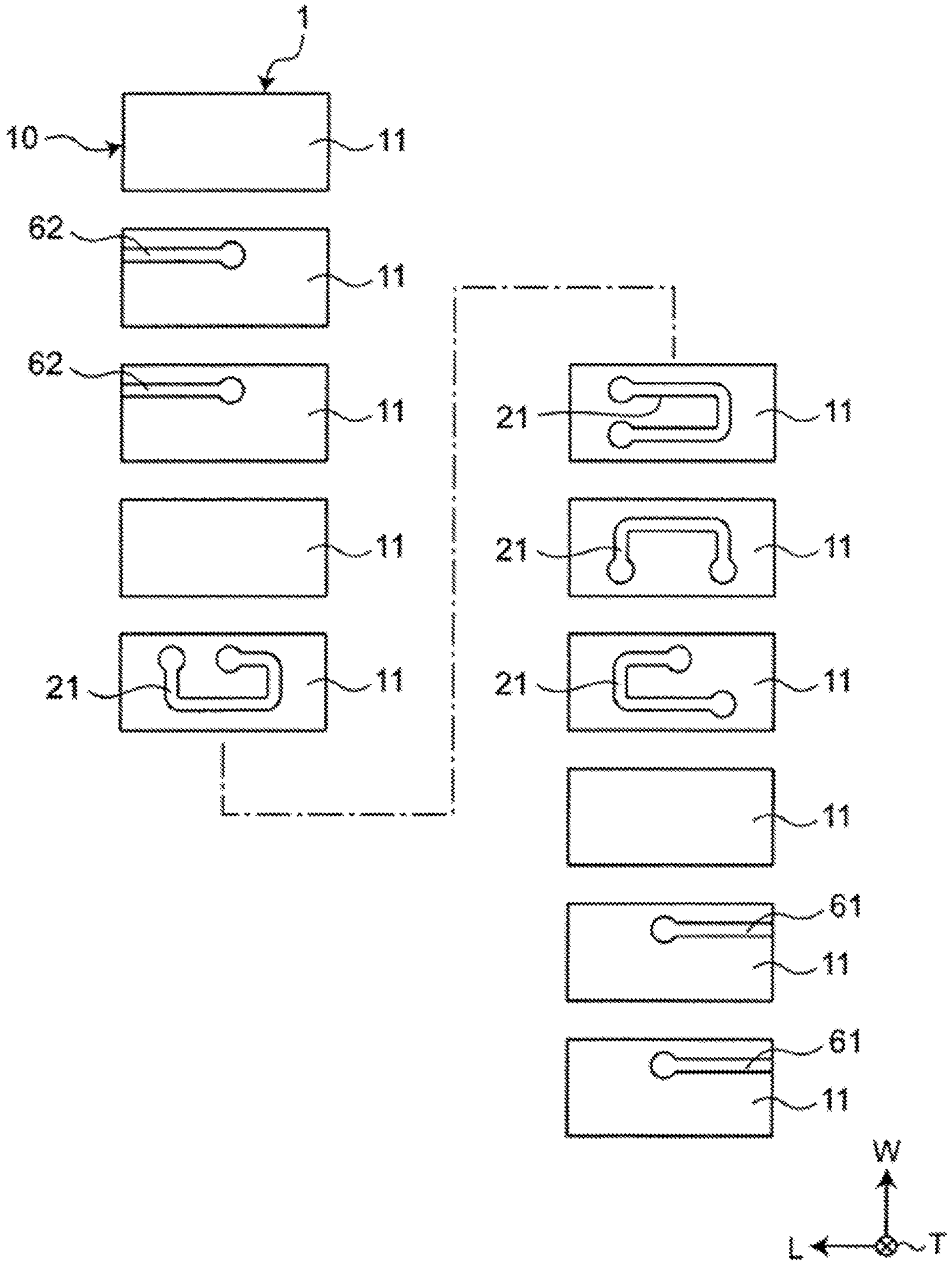
FIG. 3 is an exploded plan view of the coil component.

FIG. 1 is a perspective view illustrating an embodiment of the coil component. FIG. 2 is an X-X sectional view of FIG. 1 and is an LT sectional view passing through a center in a W direction. FIG. 3 is an exploded plan view of the coil component and illustrates a diagram along a T direction from a lower figure to an upper figure. It should be noted that the L direction is a length direction of a coil component 1, the W direction is a width direction of the coil component 1, and the T direction is a height direction of the coil component 1. Hereinafter, a forward direction in the T direction is referred to as an upper side, and a reverse direction in the T direction is also referred to as a lower side.

As illustrated in FIGS. 1, 2, and 3, the coil component 1 includes a body 10, a coil 20 provided inside the body 10, and a first external electrode 31 and a second external electrode 32 electrically connected to the coil 20 provided on a surface of the body 10.

The coil component 1 is electrically connected to a wiring of a circuit board (not illustrated) with the first and second external electrodes 31 and 32 interposed therebetween. The coil component 1 is used, for example, as a noise reduction filter, and is used in electronic devices such as personal computers, DVD players, digital cameras, TVs, mobile phones, and car electronics.

The body 10 is formed in a substantially rectangular parallelepiped shape. The surface of the body 10 has a first end face 15, a second end face 16 located on an opposite side of the first end face 15, and four side faces 17 located between the first end face 15 and the second end face 16. The first end face 15 and the second end face 16 face each other in the L direction.

The body 10 includes a plurality of magnetic layers 11. The magnetic layer 11 is stacked in the T direction. The magnetic layer 11 is made of a magnetic material such as a Ni—Cu—Zn-based ferrite material. A thickness of the magnetic layer 11 is, for example, 5 μm or more and 30 μm or less (i.e., from 5 μm to 30 μm). It should be noted that the body 10 may include a non-magnetic layer in a part.

The first external electrode 31 covers the entire first end face 15 of the body 10 and end portions of the side faces 17 of the body 10 on the first end face 15 side. The second external electrode 32 covers the entire second end face 16 of the body 10 and end portions of the side faces 17 of the body 10 on the second end face 16 side. The first external electrode 31 is electrically connected to a first end of the coil 20, and the second external electrode 32 is electrically connected to a second end of the coil 20. It should be noted that the first external electrode 31 may have an L-shape formed over the first end face 15 and one side face 17, and the second external electrode 32 may have an L-shape formed over the second end face 16 and one side face 17.

The coil 20 is spirally wound along the T direction. The coil 20 is made of, for example, a conductive material such as Ag or Cu. The coils 20 have a plurality of coil wirings 21 and a plurality of extended conductor layers 61 and 62.

Two first extended conductor layers 61, the plurality of coil wirings 21, and two second extended conductor layers 62 are arranged in order in the T direction and are electrically connected in order with via-conductors interposed therebetween. The plurality of coil wirings 21 is connected in order in the T direction to form a spiral along the T direction. The first extended conductor layer 61 is exposed from the first end face 15 of the body 10 and is connected to the first external electrode 31, and the second extended conductor layer 62 is exposed from the second end face 16 of the body 10 and is connected to the second external electrode 32. It should be noted that the numbers of first and second extended conductor layers 61 and 62 are not particularly limited, and may be, for example, one layer each.

The coil wiring 21 is formed in a shape wound in less than one turn on a plane. The extended conductor layers 61 and 62 are formed in a linear shape. A thickness of the coil wiring 21 is, for example, 10 μm or more and 40 μm or less (i.e., from 10 μm to 40 μm). Thicknesses of the first and second extended conductor layers 61 and 62 are, for example, 30 μm, but may be thinner than the thickness of the coil wiring 21.

The coil wiring 21 is sandwiched between the two magnetic layers 11. That is, the coil wiring 21 and the magnetic layer 11 are alternately laminated in one direction. In this embodiment, one direction refers to the T direction. Since the coil wiring 21 is sandwiched between the two magnetic layers 11, a shape of the coil wiring 21 becomes an elliptical shape in a cross section orthogonal to an extending direction (winding direction) of the coil wiring 21.

Each of the first and second extended conductor layers 61 and 62 is provided in a layer different from the coil wiring 21. Each of the first and second extended conductor layers 61 and 62 is sandwiched between the two magnetic layers 11.

Figure 4:
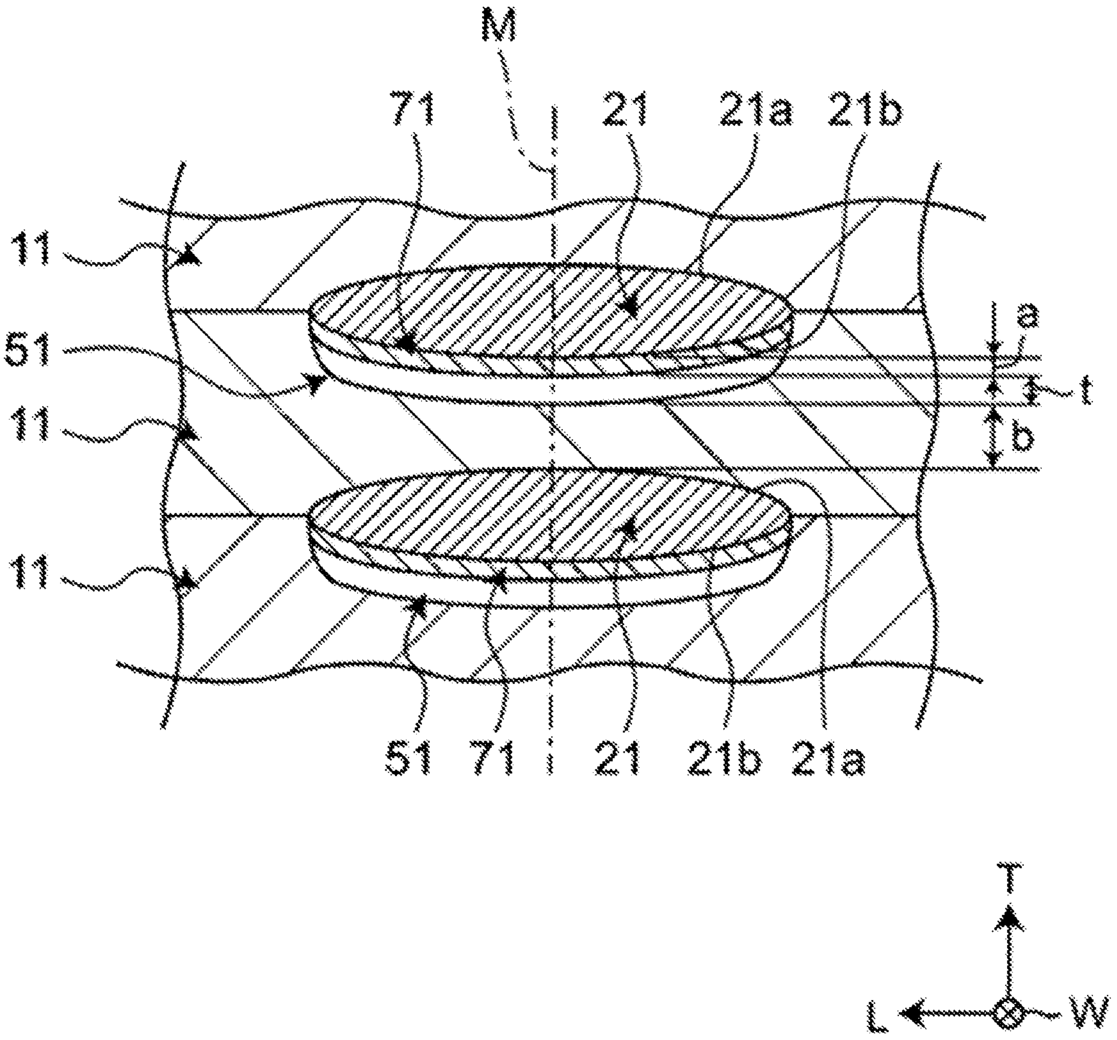
FIG. 4 is an enlarged sectional view near a coil wiring.

FIG. 4 is an enlarged sectional view near the coil wiring 21 of FIG. 2. As illustrated in FIGS. 2 and 4, gap portions 51 are present in the body 10. The gap portion 51 is located between the magnetic layer 11 and the coil wiring 21. Specifically, the coil wiring 21 has a first surface 21*a* on one side in one direction and a second surface 21*b* on the other side in one direction. In this embodiment, one side in one direction refers to the forward direction (that is, upper side) in the T direction, and the other side in one direction refers to the reverse direction (that is, lower side) in the T direction. The first surface 21*a* is the upper surface, and the second surface 21*b* is the lower surface. At least a part of the first surface 21*a* of the coil wiring 21 and one (upper) magnetic layer 11 located on the upper side of the coil wiring 21 are in contact with each other. The gap portion 51 is provided between at least a part of the second surface 21*b* of the coil wiring 21 and the other (lower) magnetic layer 11 located on the lower side of the coil wiring 21.

As stated above, the gap portion 51 between the second surface 21*b* of the coil wiring 21 and the lower magnetic layer 11, and thus, stress caused by a difference in a thermal expansion coefficient between the coil wiring 21 and the magnetic layer 11 can be suppressed. Deterioration in inductance (impedance value) due to internal stress can be eliminated, and a high impedance value (inductance value) can be secured. Since the first surface 21*a* of the coil wiring 21 and the upper magnetic layer 11 are in contact with each other, a location of the coil wiring 21 can be stabilized and a high impedance value (inductance value) can be secured as compared with a case where the gap portion 51 is present on the entire circumference of the coil wiring 21.

As illustrated in FIG. 4, a magnetic film 71 is present in at least a part of the second surface 21*b* of the coil wiring 21. The magnetic film 71 is exposed in the gap portion 51. A thickness of the magnetic film 71 is thinner than the thickness of the magnetic layer 11. A material of the magnetic film 71 is the same as the material of the magnetic layer 11. The magnetic film 71 is in the form of a single sheet and covers the entire second surface 21*b* of the coil wiring 21. It should be noted that the magnetic film 71 may be a sheet-like film or a circular dot-like film, or may be a single film or a plurality of films separated from each other. The magnetic film 71 may cover a part of the second surface 21*b* of the coil wiring 21.

As stated above, since the magnetic film 71 is present on the second surface 21*b* of the coil wiring 21, when a corrosive gas invades the gap portion 51 for some reason, the coil wiring 21 can be prevented from being corroded by the corrosive gas, and an increase in a specific resistance of the coil 20 can be suppressed.

Since the thickness of the magnetic film 71 is thinner than the thickness of the magnetic layer 11, the gap portion 51 is close to the coil wiring 21, and a sufficient stress relaxation effect is obtained. On the other hand, when the gap portion is located in a center between the coil wirings adjacent to each other in a stacking direction, the stress relaxation effect of the gap portion is not sufficient.

Preferably, when the thickness of the magnetic film 71 is a and the thickness of the lower magnetic layer 11 is b, $a/(a+b) \leq 0.1$ . . . (Equation 1) is established. Accordingly, since the thickness of the magnetic film 71 can be reduced, a further stress relaxation effect can be obtained.

Here, the thickness a of the magnetic film 71 and the thickness b of the magnetic layer 11 refer to thicknesses at a center line M of the coil wiring 21 in the width direction (W direction) in the cross section orthogonal to the extending direction of the coil wiring 21. Specifically, the cross section (called a measurement surface) which is an LT surface of the coil component and passes through the center of the coil component in the W direction is observed. The cross section of the LT surface which is the measurement surface is obtained by polishing a sample in the W direction to a depth at which a substantially central portion in the W direction is exposed. Scanning electron microscope (SEM) photographs are captured in the obtained cross section. On the measurement surface, the thicknesses of the magnetic film and the magnetic layer are measured along the center line of the coil wiring in the width direction.

Preferably, the thickness a of the magnetic film 71 is 1 μm or less. Accordingly, since the thickness of the magnetic film 71 can be reduced, a further stress relaxation effect can be obtained. This stress relaxation effect is almost the same as the effect of a structure in which the thickness a of the magnetic film 71 is zero, that is, the gap portion 51 is adjacent to the coil wiring 21 without the magnetic film 71 interposed therebetween.

Preferably, a ratio of an area where the magnetic film 71 covers the second surface 21*b* of the coil wiring 21 (also referred to as a coverage) is 50% or more and 100% or less (i.e., from 50% to 100%) with respect to an area of the second surface 21*b* of the coil wiring 21, more preferably 80% or more and 100% or less (i.e., from 80% to 100%). Accordingly, when the coverage is 100%, the coil wiring 21 can be reliably prevented from being corroded by the corrosive gas, but even though the coverage is about 50%, the corrosion can be prevented to some extent.

Here, a method for measuring the coverage will be described. The coverage can be obtained by capturing a surface on the magnetic film 71 side viewed from a direction orthogonal to the second surface 21*b* of the coil wiring 21 with an SEM in a specific range (for example, 15 μm×25 μm) at 5000× magnification, analyzing this SEM image by using analysis software (for example, A-zou kun (registered trademark) manufactured by Asahi Kasei Engineering Corporation), and obtaining a ratio of an area of the magnetic film 71 to a total value of an area of the second surface 21*b* exposed in the gap portion 51 of the coil wiring 21 and an area of the magnetic film 71.

Preferably, a thickness t of the gap portion 51 is 0.5 μm or more and 8.0 μm or less (i.e., from 0.5 μm to 8.0 μm). Here, the thickness t of the gap portion 51 refers to the thickness of the coil wiring 21 at the center line M in the width direction (W direction) in the cross section orthogonal to the extending direction of the coil wiring 21. Specifically, a method for measuring the thickness t of the gap portion 51 is the same as the method for measuring the thicknesses of the magnetic film and the magnetic layer as described above.

When the gap portion 51 has such a thickness, the stress relaxation effect is sufficiently exhibited, and the high impedance value (inductance value) of the coil component 1 is also secured since the thickness of the gap portion 51 is within a specific range.

Specifically, the stress relaxation effect is obtained in an entire operating temperature range (−40 to 150° C.) of the coil component 1. On the other hand, when the thickness t of the gap portion 51 is smaller than 0.5 μm and the operating temperature range reaches 150° C., a portion at which the thickness of the gap portion 51 is zero in a part occurs due to the difference in the thermal expansion coefficient between the magnetic layer 11 and the coil wiring 21. The stress relaxation effect is diminished, and characteristics (impedance value and inductance value) are reduced. On the other hand, when the thickness of the gap portion 51 exceeds 8.0 μm, good initial characteristics (high impedance value and inductance value) is not obtained. That is, since the magnetic flux generated from the coil 20 is concentrated in the vicinity of the coil wiring 21, a high impedance value and a high inductance value can be obtained as the magnetic layer 11 is closer to the vicinity of the coil wiring 21.

Next, a method for manufacturing the coil component 1 will be described with reference to FIGS. 5 and 7A to 7C. FIGS. 5 and 7A to 7C illustrate LT cross sections orthogonal to the extending direction of the coil wiring 21.

Figure 5:
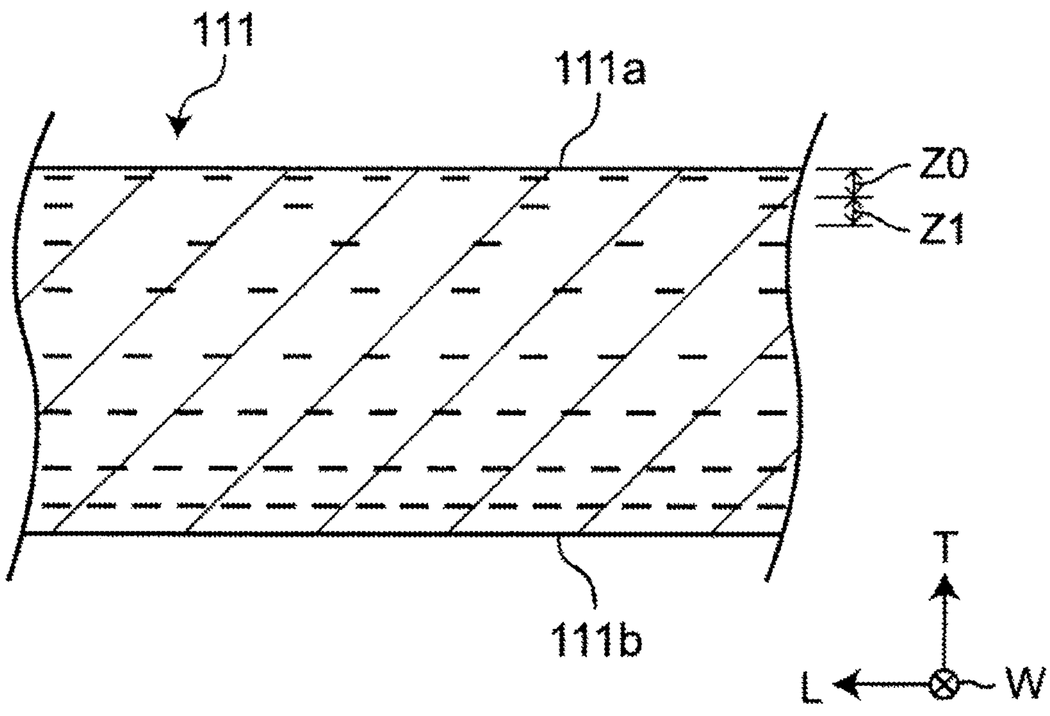
FIG. 5 is a sectional view illustrating a method of manufacturing the coil component.

First, an unfired magnetic layer 111 containing a magnetic material and binders is prepared as illustrated in FIG. 5. This is called a preparatory step. The unfired magnetic layer 111 is a state before the magnetic layer 11 is fired. The unfired magnetic layer 111 is formed by, for example, a magnetic sheet or a magnetic paste.

The magnetic material is not particularly limited, and for example, a ferrite material containing $Fe_2O_3$, ZnO, CuO, and NiO can be used. The magnetic material may further contain an additive. Examples of the additive include $Mn_3O_4$, $Co_3O_4$, $SnO_2$, $Bi_2O_3$, and $SiO_2$.

The binder is, for example, any of polyvinyl butyral (PVB), polyvinyl alcohol (PVA), polyvinyl acetate, polyethylene, acrylic, polyurethane, polyvinyl chloride, or polystyrene.

The unfired magnetic layer 111 includes an upper first main surface 111*a* and a lower second main surface 111*b*. The amount of binders contained in the unfired magnetic layer 111 increases continuously or stepwisely from the first main surface 111*a* to the second main surface 111*b* except for at least the first main surface 111*a*. In FIG. 5, for the sake of convenience, the binders are indicated by broken lines, and the number of broken lines indicates the amount of binders.

Specifically, the unfired magnetic layer 111 includes a surface layer region Z0 including the first main surface 111*a* and a minimum amount layer region Z1 adjacent to the surface layer region Z0 and having the smallest amount of binders. The amount of binders in the surface layer region Z0 is larger than the amount of binders in the minimum amount layer region Z1. Here, the surface layer region Z0 refers to a layered region in a range of 1 μm or less from the first main surface 111*a* in the thickness direction in the T direction. The minimum amount layer region Z1 is a layered region having the smallest amount of binders in the unfired magnetic layer 111.

Figure 6:
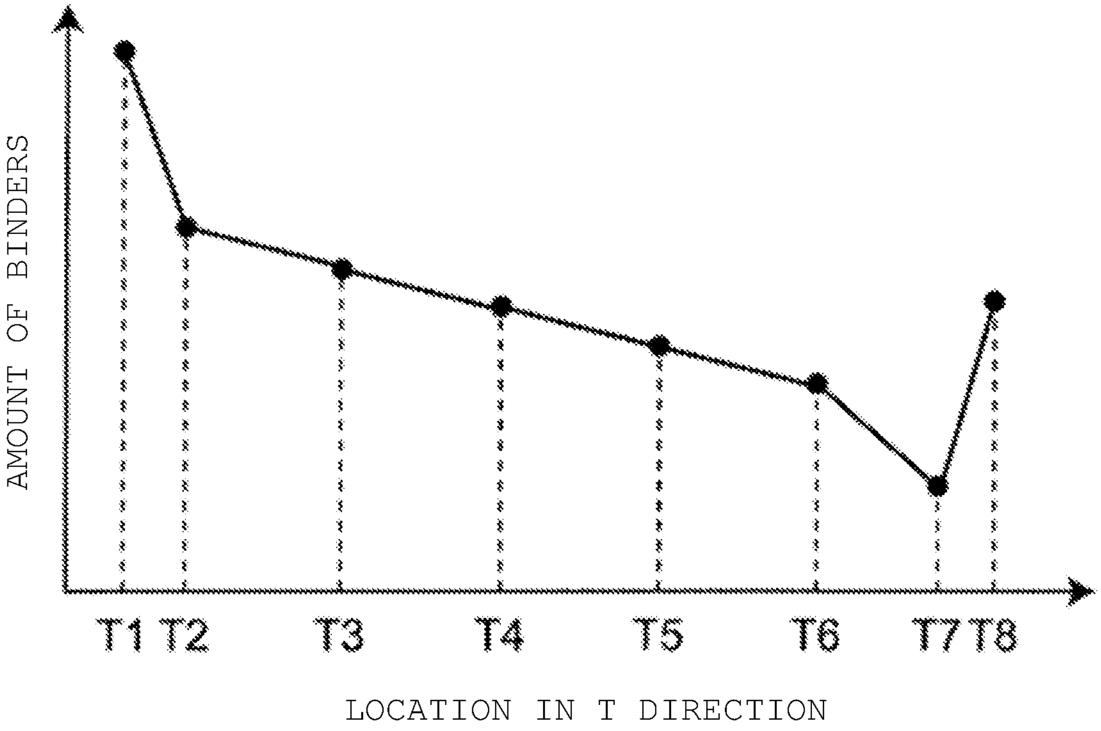
FIG. 6 is a graph illustrating a relationship between a location of an unfired magnetic layer in a T direction and the amount of binders contained in the unfired magnetic layer.

FIG. 6 illustrates a relationship between the location of the unfired magnetic layer 111 in the T direction (thickness direction) and the amount of binders contained in the unfired magnetic layer 111. In FIG. 6, the locations in the T direction are T1 to T8 in order from the second main surface 111*b* to the first main surface 111*a*. The location of T1 is the second main surface 111*b*, and the location of T8 is the first main surface 111*a*. The location of T8 is included in the surface layer region Z0, and the location of T7 is included in the minimum amount layer region Z1.

As illustrated in FIG. 6, the amount of binders decreases from the location of T1 to the location of T7 except for the location of T8. The amount of binders is the smallest at the location of T7. The amount of binders decreases linearly from the location of T2 to the location of T6. The amount of binders at the location of T1 more sharply increases than the location of T2. The amount of binders at the location of T8 further increases than the location of T7 which is about the same amount as the location of T4.

As stated above, the concentration of binders (resin) in the unfired magnetic layer 111 is shaded, and thus, it is possible to increase or decrease strength in the unfired magnetic layer 111 being degreased. That is, when the amount of binders is large (the binder concentration is high), the strength thereof becomes strong, and when the amount of binders is small (the binder concentration is low), the strength becomes weak.

Here, an example of a method for segregating the binders in the unfired magnetic layer 111 will be described.

When a ceramic green sheet as the unfired magnetic layer 111 is formed on a support, the binders are moved downward by gravity, and a large amount of binders are distributed on the lower surface (second main surface 111*b*) side of the green sheet in contact with the support. The large amount of binders is present on the support side by slowing down a forming rate of the green sheet and lowering a drying temperature of the green sheet. The amount of binders on the upper surface of the green sheet can be increased than the mount of binders in a region located inside by a predetermined distance from the upper surface of the green sheet by drying the upper surface of the green sheet (first main surface 111*a*) faster than inside the green sheet. By doing this, the binders in the unfired magnetic layer 111 are controlled to be segregated.

As another method for segregating the binders, a ceramic green sheet is formed by using a slurry containing a resin modified with fluorine on a carrier film. Accordingly, the resin modified with fluorine in the ceramic green sheet easily migrates to the carrier film side having the same polar group, and thus, a so-called interfacial segregation phenomenon is caused.

A steric hindrance type dispersant is used as another method for segregating the binders. The steric hindrance type dispersant, for example, an allyl ether polymer is used as the dispersant. Accordingly, since the binder is light, the binder is segregated upward, and the concentration of binders changes in the thickness direction.

Figure 7A:
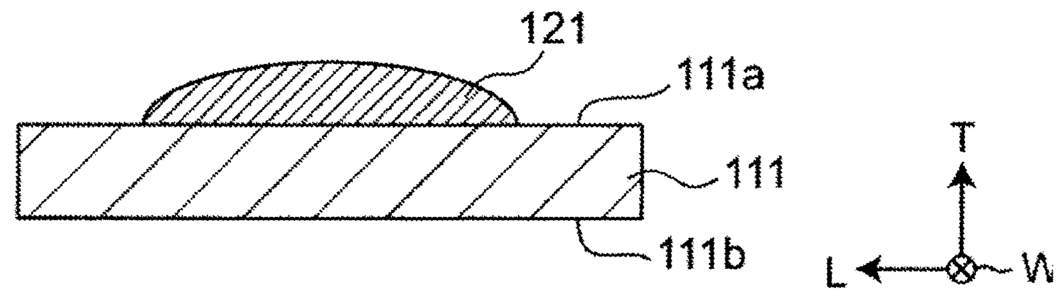
FIG. 7A is a sectional view illustrating a method of manufacturing the coil component.
Figure 7B:
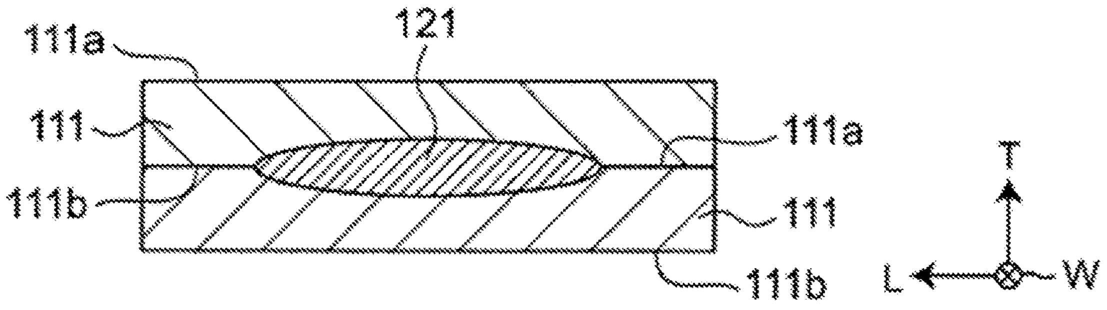
FIG. 7B is a sectional view illustrating the method of manufacturing the coil component.

The unfired coil wiring 121 is stacked so as to be sandwiched between the two unfired magnetic layers 111. This is called a stacking step. The unfired coil wiring 121 is in a state before the coil wiring 21 is fired. The unfired coil wiring 121 is formed by, for example, a conductor paste. Specifically, the unfired coil wiring 121 is stacked on the first main surface 111*a* of the lower unfired magnetic layer 111 as illustrated in FIG. 7A, and the upper unfired magnetic layer 111 is stacked on the lower unfired magnetic layer 111 and the unfired coil wiring 121 as illustrated in FIG. 7B. Accordingly, the unfired coil wiring 121 is brought into contact with the second main surface 111*b* of the upper unfired magnetic layer 111 and the first main surface 111*a* of the lower unfired magnetic layer 111. The unfired coil wiring 121 and the unfired magnetic layer 111 are stacked in order, and a stacked block body is formed by repeating this process. This stacked block body is individualized.

Thereafter, the unfired magnetic layer 111 and the unfired coil wiring 121 are fired, the upper magnetic layer 11 of the fired upper unfired magnetic layer 111 and the coil wiring 21 of the fired unfired coil wiring 121 are brought into contact with each other as illustrated in FIG. 4, and the magnetic film 71 is formed in at least a part of the surface (second surface 21*b*) of the coil wiring 21 on the gap portion 51 side while forming the gap portion 51 between the lower magnetic layer 11 of the fired unfired lower unfired magnetic layer 111 and the coil wiring 21. This is called a firing step.

Figure 7C:
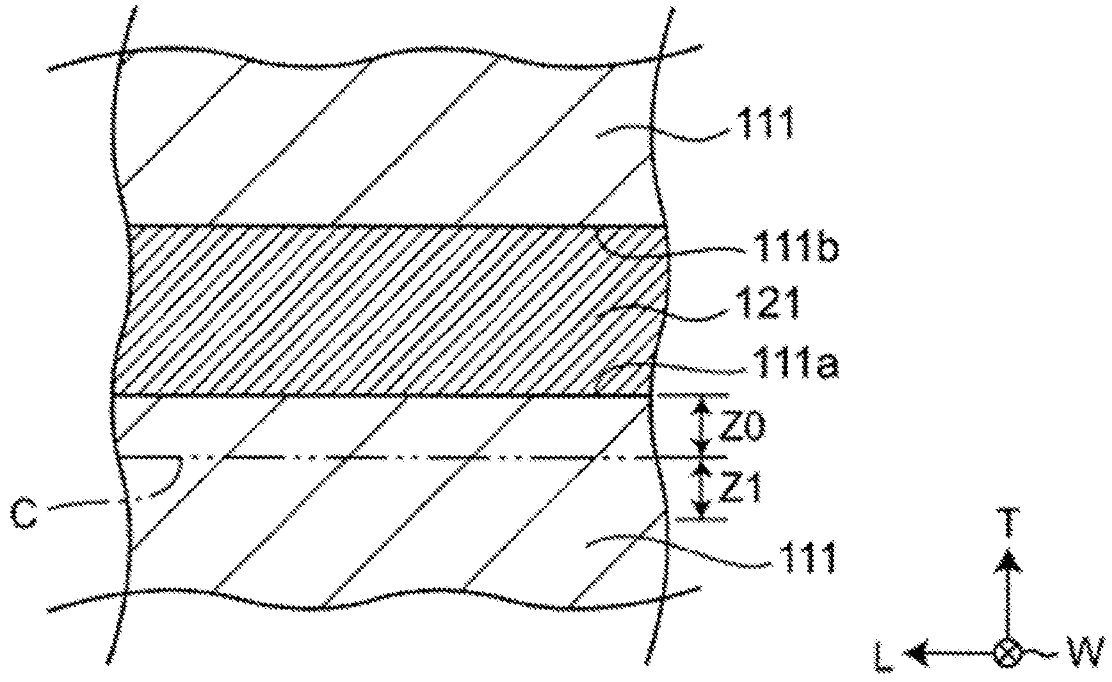
FIG. 7C is a sectional view illustrating the method of manufacturing the coil component.

Specifically, as illustrated in FIG. 7C, at least a part of the surface layer region Z0 of the lower unfired magnetic layer 111 is torn from the other part of the lower unfired magnetic layer 111 and is attached to the unfired coil wiring 121. For example, the unfired magnetic layer 111 is broken at an interface C indicated by a dashed double-dotted line between the surface layer region Z0 and the minimum amount layer region Z1.

Here, the breakage (tearing) of the unfired magnetic layer 111 in the firing step will be described. Since the amount of binders in the surface layer region Z0 is larger than the amount of binders in the minimum amount layer region Z1, the binders in the surface layer region Z0 contribute to the bonding between the surface layer region Z0 of the unfired magnetic layer 111 and the unfired coil wiring 121 during degreasing in a firing procedure. As stated above, during degreasing in the firing procedure, the unfired coil wiring 121 is contracted in a state in which the bonding between the first main surface 111*a* of the unfired magnetic layer 111 and the unfired coil wiring 121 is expressed. By doing this, since the amount of binders in the minimum amount layer region Z1 is the smallest, the strength of the minimum amount layer region Z1 is the weakest, and the tearing of the unfired magnetic layer 111 occurs in the minimum amount layer region Z1 (interface C) during degreasing in the firing procedure. As stated above, the breakage can selectively occur in a weak strength portion of the unfired magnetic layer 111.

The magnetic film 71 is formed by firing the portion of the lower unfired magnetic layer 111 attached to the unfired coil wiring 121. Accordingly, since the magnetic film 71 is formed from at least a part of the surface layer region Z0 of the lower unfired magnetic layer 111, the magnetic film 71 can be easily formed. In short, in the firing step, when the unfired coil wiring 121 contracts, the breakage of the unfired magnetic layer 111 occurs, and the magnetic film 71 can be formed while forming the gap portion 51.

On the other hand, since the amount of binders on the second main surface 111*b* of the upper unfired magnetic layer 111 is the largest, the strength on the second main surface 111*b* is the strongest, and the tearing of the portion of the upper unfired magnetic layer 111 on the second main surface 111*b* side does not occur during degreasing of the firing procedure. Thus, the upper magnetic layer 11 and the coil wiring 21 can be brought into contact with each other.

It should be noted that when the unfired magnetic layer in which the amount of binders simply increases from the first main surface to the second main surface is used and the amount of binders contained in the first main surface is the smallest, the tearing of the unfired magnetic layer does not occur, the magnetic film is not formed, and only the gap portion is formed in the firing step.

Thereafter, the coil component 1 is manufactured by providing the external electrodes 31 and 32 on the body 10 as illustrated in FIG. 1. Accordingly, the location of the coil 20 is stabilized while relaxing the stress. When the corrosive gas invades the gap portion for some reason, the coil wiring can be prevented from being corroded by the corrosive gas, and the coil component 1 capable of suppressing the increase in the specific resistance of the coil 20 can be easily manufactured.

Next, an example of the method for manufacturing the coil component 1 will be described.

The magnetic sheet is used as the unfired magnetic layer. The thickness of the magnetic sheet is 35 μm. The magnetic material of the magnetic sheet is a Ni—Cu—Zn-based ferrite material. The binder of the magnetic sheet is polyvinyl butyral (PVB). The ratio of binders may be about 8 wt % or more and 16 wt % or less (i.e., from about 8 wt % to 16 wt %). In the magnetic sheet, the amount of binders increases from the upper surface to the lower surface except for the upper surface.

A coil conductor paste is used as the unfired coil wiring. The conductor powder of the coil conductor paste is Ag. The binder of the coil conductor paste is ethyl cellulose, and the ratio of binders may be about 1.0 wt % or more and 5.0 wt % or less (i.e., from about 1.0 wt % to 5.0 wt %).

The stacked block body is formed by using the magnetic sheet and the coil conductor paste, is individualized, and then is fired. In the firing procedure, when the coil conductor paste contracts, the breakage (tearing) occurs in a portion of the magnetic sheet where the amount of binders is small, and the gap portion is formed while forming the magnetic film.

Figure 8:
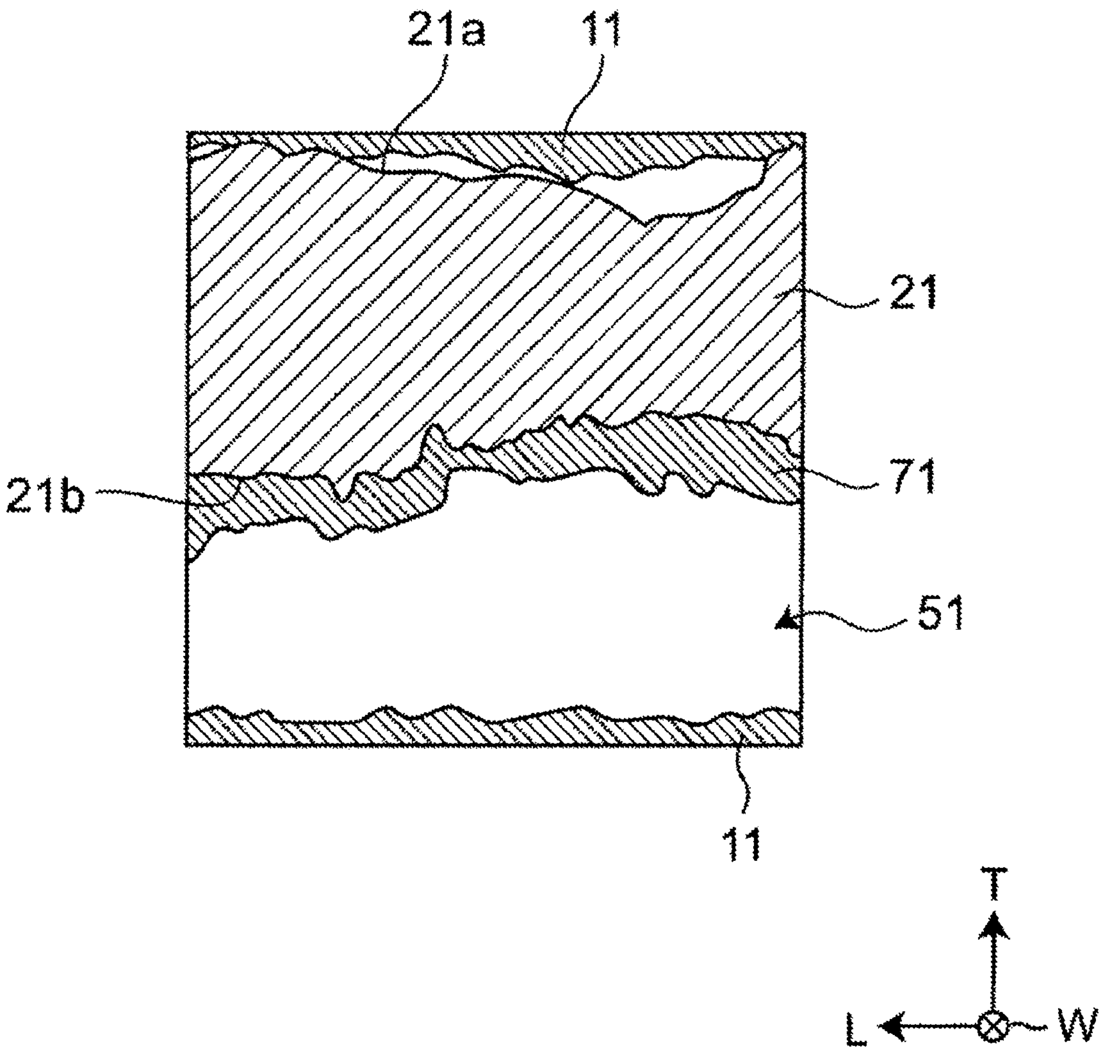
FIG. 8 is a schematic diagram based on an image illustrating a state of a fired magnetic layer, magnetic film, and coil wiring.

FIG. 8 is a schematic diagram based on an image illustrating a state of the fired magnetic layer 11, magnetic film 71, and coil wiring 21. In FIG. 8, the coil wiring 21 was polished until the cross section can be confirmed, an image was acquired by observing the coil wiring with FE-SEM: JSM-7900F (JEOL Ltd.) with a low vacuum mode: 20 Pa, WD=10 mm, detectors: LVBEDC and LVSED, and an outline of this image was drawn. As illustrated in FIG. 8, the gap portion 51 is provided between the second surface 21$b$ of the coil wiring 21 and the lower magnetic layer 11, and the first surface 21$a$ of the coil wiring 21 and the upper magnetic layer 11 are in contact with each other. The magnetic film 71 is present on the second surface 21$b$ of the coil wiring 21.

It should be noted that the present disclosure is not limited to the above-described embodiment, and the design can be changed without departing from the gist of the present disclosure. For example, an increase or a decrease in the number of coil wirings can be changed. A shape of the external electrode may be an L-shape or the like.

Although it has been described in the above embodiment that "one side in one direction" is the forward direction in the T direction and "the other side in one direction" is the reverse direction in the T direction, "one side in one direction" may be the reverse direction in the T direction and "the other side of one direction" may be the forward direction in the T direction. At this time, the lower surface (first surface) of the coil wiring and the lower magnetic layer of the coil wiring are in contact with each other, the gap portion is formed between the upper surface (second surface) of the coil wiring and the upper magnetic layer of the coil wiring, and the magnetic film is present on the upper surface of the coil wiring.

Although it has been described in the above embodiment that the upper and lower magnetic layers sandwich only the coil wiring, an intermediate magnetic layer may be provided in the same layer as the coil wiring in addition to the upper and lower magnetic layers, and the upper and lower magnetic layers may sandwich the coil wiring and the intermediate magnetic layer. Accordingly, since the intermediate magnetic layer is provided, the thickness of the coil wiring can be maintained, and a DC resistance value of the coil wiring can be reduced.

Although it has been described in the above embodiment that the gap portion is formed between the coil wiring and the lower magnetic layer, the gap portion may be further formed in a part between the coil wiring and the upper magnetic layer. Although the coil wiring is one conductor layer, a plurality of conductor layers may be formed in surface contact with each other.

What is claimed is:

1. A coil component comprising:

a body having a plurality of stacked magnetic layers; and a coil provided inside the body and having a plurality of stacked coil wirings, wherein the magnetic layers and the coil wirings are alternately stacked in one direction, a first surface of the coil wiring on one side in the one direction and one of the magnetic layers located on one side in the one direction of the coil wiring are in contact with each other, a gap portion exists between a second surface of the coil wiring on an other side in the one direction and another of the magnetic layers located on the other side in the one direction of the coil wiring, and a magnetic film is present in at least a part of the second surface of the coil wiring.

2. The coil component according to claim 1, wherein, when a thickness of the magnetic film is a and a thickness of the other magnetic layer is b, the following equation is satisfied $$a/(a+b)\leq 0.1 \ldots \text{(Equation 1)}.$$

3. The coil component according to claim 1, wherein a thickness of the magnetic film is 1 μm or less.

4. The coil component according to claim 1, wherein a ratio of an area of the second surface of the coil wiring covered by the magnetic film is from 50% to 100% with respect to an area of the second surface of the coil wiring.

5. The coil component according to claim 1, wherein a thickness of the gap portion is from 0.5 μm to 8.0 μm.

6. The coil component according to claim 2, wherein a thickness of the magnetic film is 1 μm or less.

7. The coil component according to claim 2, wherein a ratio of an area of the second surface of the coil wiring covered by the magnetic film is from 50% to 100% with respect to an area of the second surface of the coil wiring.

8. The coil component according to claim 3, wherein a ratio of an area of the second surface of the coil wiring covered by the magnetic film is from 50% to 100% with respect to an area of the second surface of the coil wiring.

9. The coil component according to claim 6, wherein a ratio of an area of the second surface of the coil wiring covered by the magnetic film is from 50% to 100% with respect to an area of the second surface of the coil wiring.

10. The coil component according to claim 2, wherein a thickness of the gap portion is from 0.5 μm to 8.0 μm.

11. The coil component according to claim 3, wherein a thickness of the gap portion is from 0.5 μm to 8.0 μm.

12. The coil component according to claim 4, wherein a thickness of the gap portion is from 0.5 μm to 8.0 μm.

13. The coil component according to claim 6, wherein a thickness of the gap portion is from 0.5 μm to 8.0 μm.

14. The coil component according to claim 7, wherein a thickness of the gap portion is from 0.5 μm to 8.0 μm.

15. The coil component according to claim 8, wherein a thickness of the gap portion is from 0.5 μm to 8.0 μm.

16. The coil component according to claim 9, wherein a thickness of the gap portion is from 0.5 μm to 8.0 μm.

* * * * *